(12) United States Patent
Millen et al.

(10) Patent No.: US 6,309,450 B1
(45) Date of Patent: Oct. 30, 2001

(54) FLOW-THROUGH ADSORBENT UNIT ASSEMBLY FOR RECEIVER DRYER

(75) Inventors: Peter R. Millen, Perry, NY (US); Stephen F. Sullivan, Boardman, OH (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 09/692,698

(22) Filed: Oct. 19, 2000

Related U.S. Application Data

(63) Continuation-in-part of application No. 09/456,669, filed on Dec. 9, 1999, now abandoned.

(51) Int. Cl.[7] .............................. B01D 53/04; B01D 53/26
(52) U.S. Cl. .................. 96/131; 96/135; 96/137; 96/147; 96/149; 96/151; 55/513; 55/DIG. 17; 210/282
(58) Field of Search ....................... 55/513, 515, 522, 55/DIG. 17; 96/131–141, 147, 149, 151; 210/282

(56) References Cited

U.S. PATENT DOCUMENTS

| | | | |
|---|---|---|---|
| 2,758,719 | * 8/1956 | Line ................................. 96/147 X |
| 3,221,478 | 12/1965 | Norton . |
| 3,353,339 | * 11/1967 | Walter ................................ 96/137 |
| 3,407,936 | 10/1968 | Balogh . |
| 3,799,352 | 3/1974 | McClive . |
| 3,815,752 | 6/1974 | Hoffman et al. . |
| 3,879,292 | 4/1975 | McClive . |
| 4,436,623 | 3/1984 | Cullen et al. . |
| 4,457,843 | 7/1984 | Cullen et al. . |
| 4,908,132 | * 3/1990 | Koval et al. ...................... 96/137 X |
| 5,569,316 | * 10/1996 | Flaugher et al. ..................... 96/135 |
| 5,689,893 | * 11/1997 | Mitsch ............................. 96/137 X |
| 5,716,432 | * 2/1998 | Perrine ................................ 96/135 |
| 5,718,743 | 2/1998 | Donnelly et al. . |
| 5,759,241 | * 6/1998 | Klett et al. ......................... 96/134 |
| 5,779,772 | * 7/1998 | Unger et al. ........................ 96/137 |
| 5,785,742 | * 7/1998 | Mitsch ............................. 96/151 X |
| 5,865,998 | * 2/1999 | Abraham et al. ................. 96/131 X |
| 5,910,165 | * 6/1999 | Haramoto et al. ................. 96/151 X |
| 6,170,288 | * 1/2001 | Incorvia ............................ 96/135 X |
| 6,178,772 | * 1/2001 | Incorvia ............................ 96/135 X |

* cited by examiner

Primary Examiner—Robert H. Spitzer
(74) Attorney, Agent, or Firm—Joseph P. Gastel

(57) ABSTRACT

An adsorbent unit assembly including a holder, an elongated member on the holder, an enlarged portion at the end of the elongated member, a cylindrical adsorbent unit having an opening therein for receiving the elongated member, and a grid mounted on the elongated member on the opposite side of the adsorbent unit from the enlarged portion. The foregoing adsorbent unit assembly is mounted within the housing of a receiver dryer by compressing one or more adsorbent units on the elongated member between the grid and the enlarged portion so as to cause the outer sides of the adsorbent units to bear against the inside surface of the housing while the grid also provides an interference fit with the housing.

42 Claims, 8 Drawing Sheets

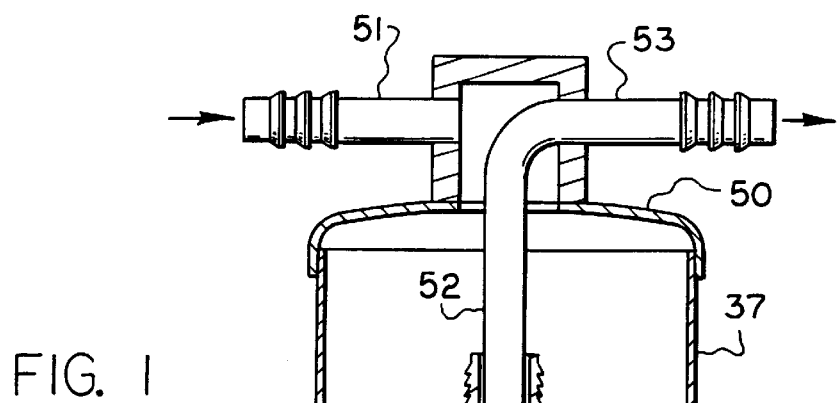
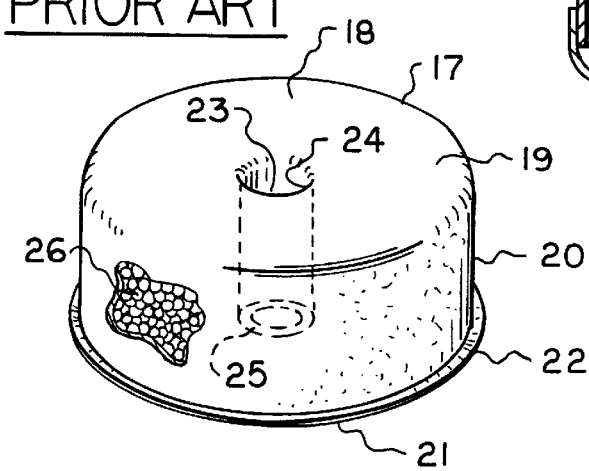
FIG. 1
FIG. 2
PRIOR ART

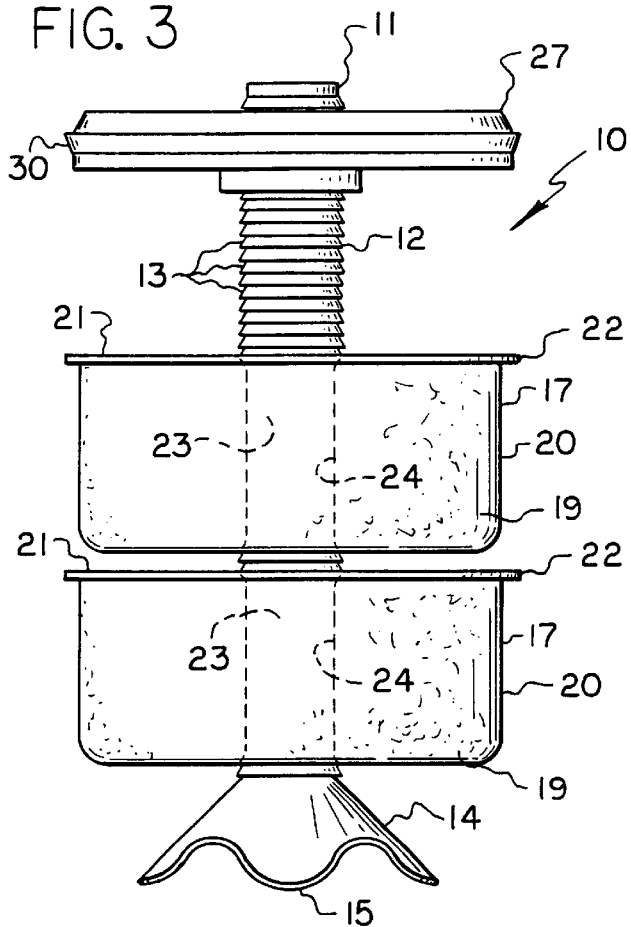
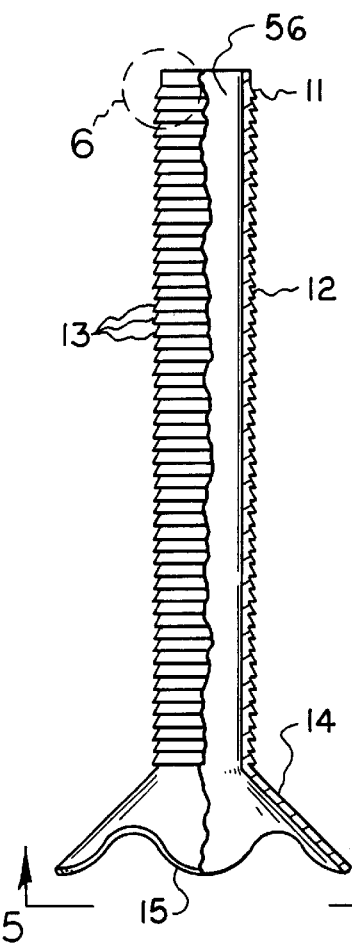
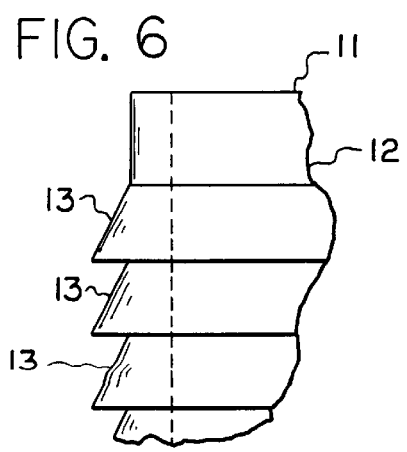
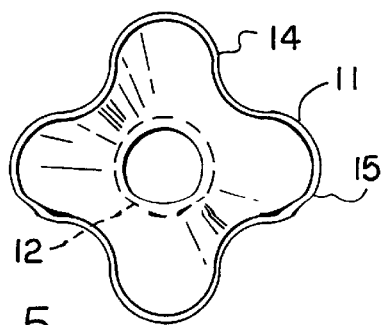

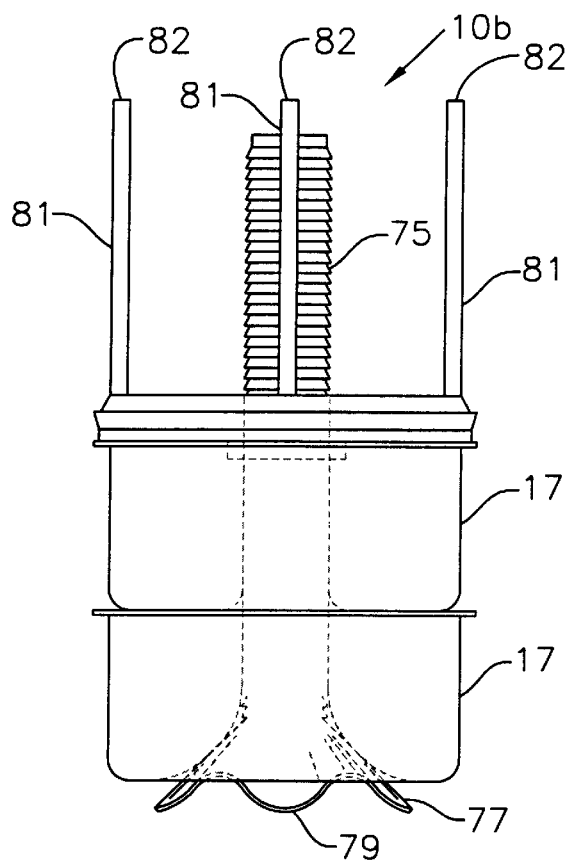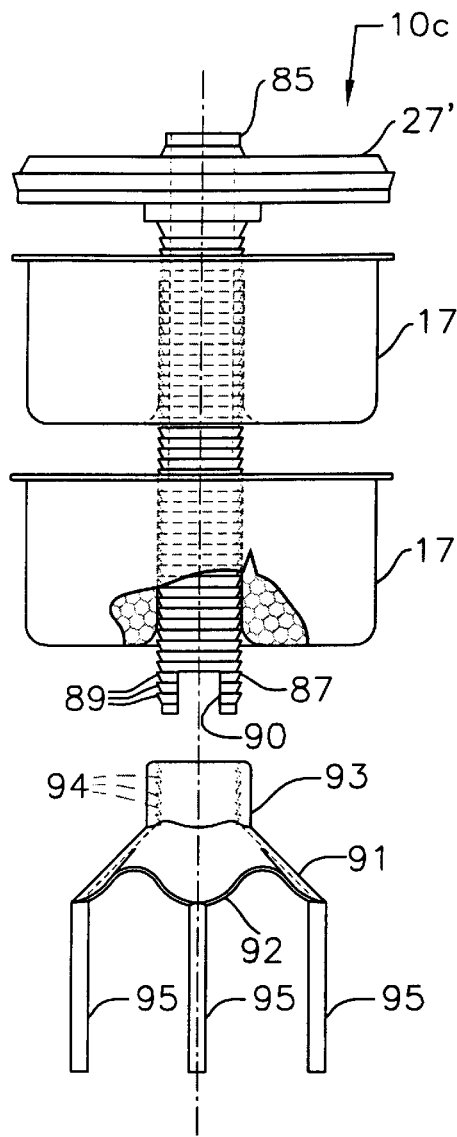
FIG. 16
FIG. 17

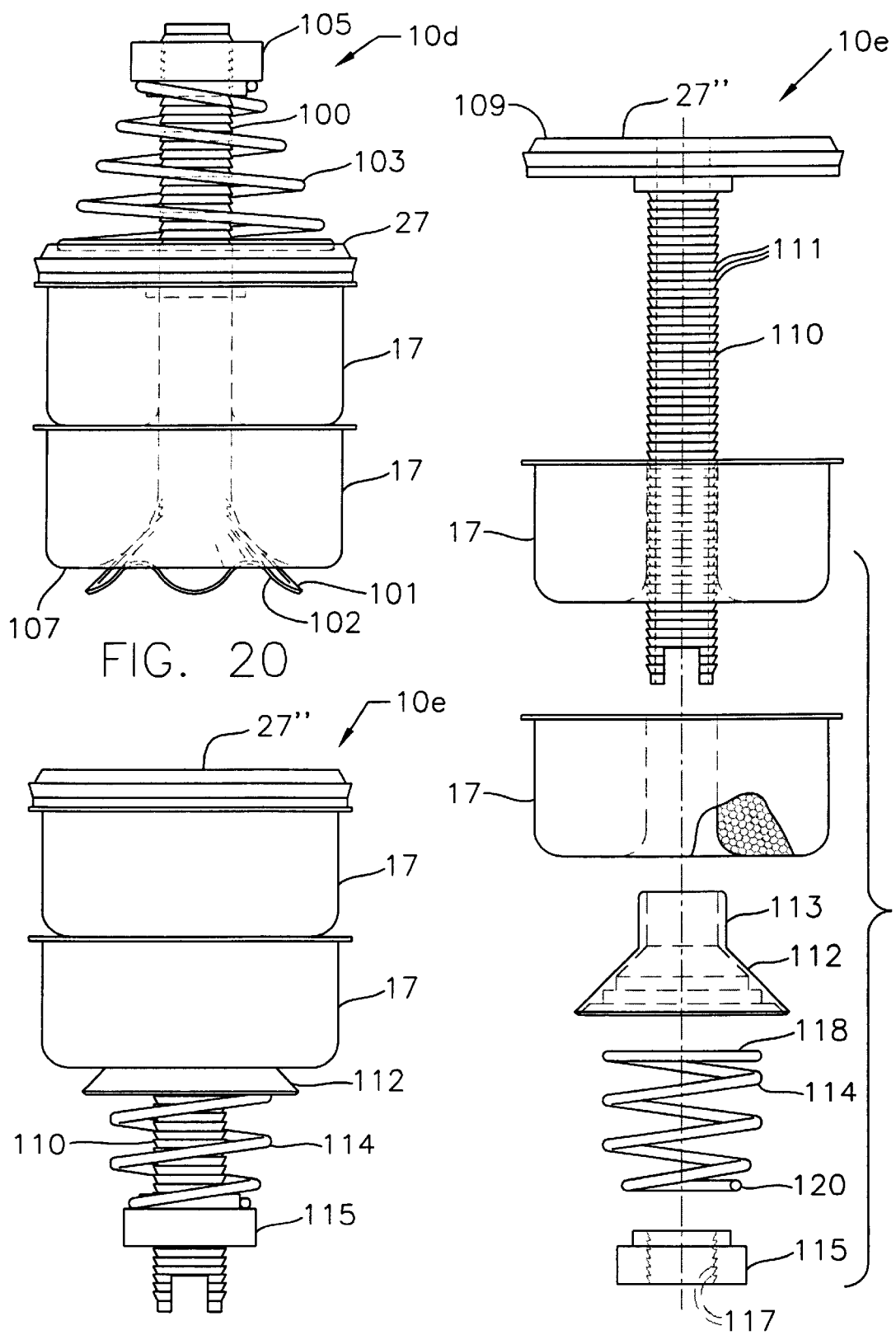

FLOW-THROUGH ADSORBENT UNIT ASSEMBLY FOR RECEIVER DRYER

CROSS-REFERENCE TO RELATED APPLICATIONS

The present application is a continuation-in-part of application Ser. No. 09/456,669, filed Dec. 9, 1999.

STATEMENT REGARDING FEDERALLY SPONSORED RESEARCH OR DEVELOPMENT

Not Applicable

BACKGROUND OF THE INVENTION

The present invention relates to an improved flow-through adsorbent unit assembly for mounting in a receiver dryer of an automotive air conditioning system.

By way of background, adsorbent units are placed in receiver dryers of automotive air conditioning systems for the purpose of adsorbing moisture from the refrigerant. It is desirable that the adsorbent units occupy the entire cross sectional refrigerant path through the receiver dryer so as to insure complete contact between the refrigerant and the adsorbent for best moisture adsorption.

BRIEF SUMMARY OF THE INVENTION

It is one object of the present invention to provide an adsorbent unit assembly which can be mounted in a receiver dryer in a simple and efficient manner and which will provide a substantially complete cross sectional path through which refrigerant must pass.

Another object of the present invention is to provide an improved adsorbent unit assembly containing a plurality of parts which can be mounted within a receiver dryer prior to the time that the receiver dryer is finally assembled. Other objects and attendant advantages of the present invention will readily be perceived hereafter.

The present invention relates to an adsorbent unit assembly comprising a holder, an elongated member on said holder, an enlarged portion on said elongated member, a cylindrical adsorbent unit, a central opening in said cylindrical adsorbent unit receiving said elongated member, and a grid on said elongated member on the opposite side of said adsorbent unit from said enlarged portion.

The present invention also relates to a receiver dryer having a cylindrical housing and a central tube within said housing, the improvement comprising a holder, an elongated member on said holder positioned on said central tube, an enlarged member on said elongated member, a grid mounted on said elongated member, at least one adsorbent unit having an outer periphery with said adsorbent unit being mounted on said elongated member and compressed between said grid and said enlarged member with said outer periphery of said adsorbent unit in engagement with said cylindrical housing.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a cross sectional view of the flow-through adsorbent unit assembly installed in a receiver dryer;

FIG. 2 is a perspective view, partially broken away, of an adsorbent unit which is mounted on the adsorbent unit assembly;

FIG. 3 is a side elevational view of the flow-through adsorbent unit assembly in an assembled condition prior to being installed into a receiver dryer;

FIG. 4 is a side elevational view, partially broken away, of the holder of the adsorbent unit assembly;

FIG. 5 is an end elevational view of the holder taken substantially in the direction of arrows 5—5 of FIG. 4;

FIG. 6 is a fragmentary enlarged portion of the holder taken in the area designated by numeral 6 on FIG. 4;

FIG. 16 is a fully assembled view of the components of FIG. 14;

FIG. 17 is a side elevational partially exploded view of still another embodiment of the present invention;

FIG. 20 is a side elevational view of the flow-through adsorbent unit assembly of FIG. 19 in assembled condition;

FIG. 21 is a side elevational partially exploded view of still another embodiment of a flow-through adsorbent unit assembly; and FIG. 22 is a side elevational view of the flow-through adsorbent unit assembly of FIG. 21 in assembled condition.

DETAILED DESCRIPTION OF THE INVENTION

Figure 7:
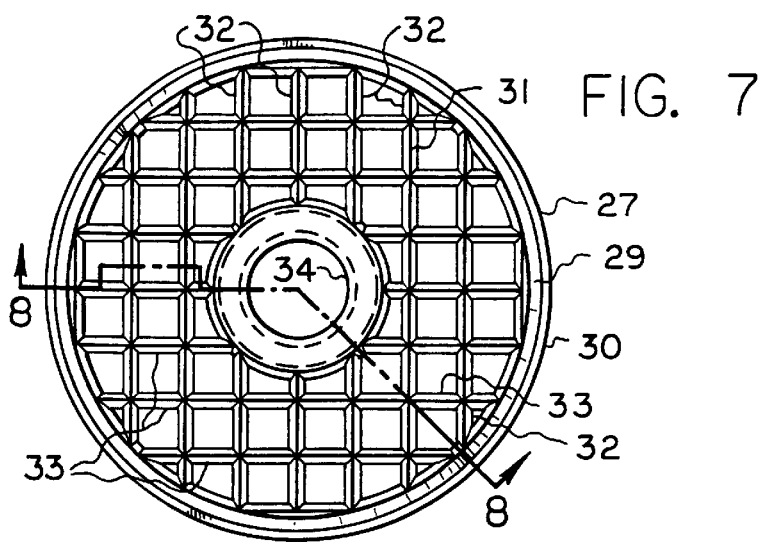
FIG. 7 is a top plan view of the grid portion of the adsorbent unit assembly taken substantially in the direction of arrows 7—7 of FIG. 8.
Figure 8:
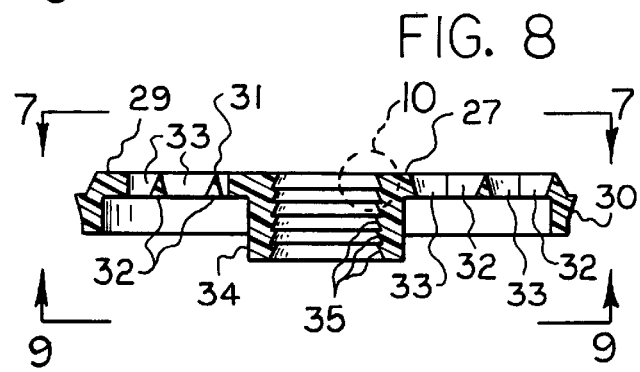
FIG. 8 is a cross sectional view taken substantially along line 8—8 of FIG. 7.
Figure 10:
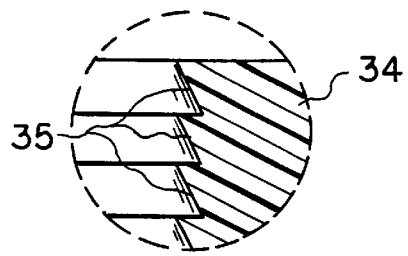
FIG. 10 is an enlarged view partially in cross section of the area of FIG. 8 denoted by numeral 10.
Figure 9:
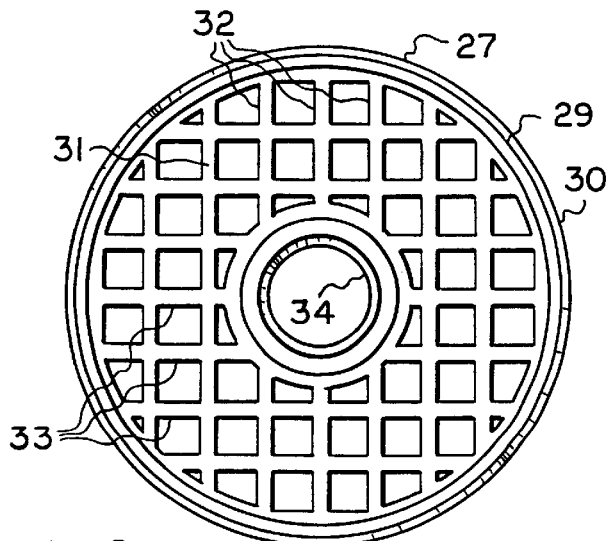
FIG. 9 is a bottom plan view of the grid portion of the adsorbent unit assembly taken substantially in the direction of arrows 9—9 of FIG. 8.

The various components of the adsorbent unit assembly 10 are shown in FIGS. 3–10. The adsorbent unit assembly 10 includes a holder 11 which includes an elongated member 12 having downwardly oriented annular serrations 13 extending throughout the length of the tubular portion 12 thereof, although they need be located only on the upper portion thereof. Tubular portion 12 terminates at an enlarged portion, namely, frustoconical end portion 14 with its smaller end forming a part of tubular member 12 and its larger end being formed into an undulating edge 15.

Two adsorbent units 17 are mounted on elongated tubular portion 12 of holder 11. Each adsorbent unit includes an upper inverted cup-shaped portion 19 of porous polyester fabric which is formed with a top 18 and an outer cylindrical edge 20 and is joined to a planar base 21 of porous polyester fabric along an annular fused seam 22. Each adsorbent unit 17 is formed with a central cylindrical opening 23, the side 24 of which is a continuation of the porous polyester top 18, and the lower annular end of side 24 is fused to bottom 21 at annular seam 25. The adsorbent unit 17 contains a suitable particulate adsorbent 26 which is preferably molecular sieve but it may be silica gel or any other well-known adsorbent.

The adsorbent unit 17 is known in the prior art.

The adsorbent unit assembly 10 also includes a molded plastic grid 27 having an outer annular rim 29 formed with a seal-type edge 30. A lattice 31 of crossing strips 32 and 33 extends between outer rim 29 and inner tubular member 34. The central tubular member 34 includes upwardly pointing serrations 35. The cross strips 32 and 33 may be of the configurations shown in U.S. Pat. No. 5,718,743.

The adsorbent unit assembly 10 is installed in a receiver dryer 37 which is part of a conventional prior art automotive air conditioning system consisting of a compressor, condenser, expansion valve and evaporator, with the receiver dryer 37 being installed between the condenser and the expansion valve.

The receiver dryer 37 includes a cylindrical housing 39, a bottom 40 and a top 50. It also includes an inlet tube 51 which is in communication with the inside of housing 39 so that refrigerant passes through the housing and into opening 48 of centrally positioned tube 52 having an outlet tube 53 at its outer end so that refrigerant flows upwardly into tube 52.

In accordance with the present invention, the adsorbent unit assembly 10 is mounted on tube 52 so that refrigerant will pass downwardly through grid 27 and flow through adsorbent units 17 and then into the bottom opening 48 of tube 52 as indicated by arrows 54.

The adsorbent unit assembly 10 is installed in the receiver dryer housing 39 in the following manner. In this respect, the top 50 has not yet been secured to housing 39. The adsorbent unit assembly 10 is placed within housing 39 in essentially the condition shown in FIG. 3, and the elongated tube 12 is manually centered within housing 39. The tube 12 is then held at its top above grid 27, and the grid 27 is moved downwardly on serrated tube 12 until the central portion 34 thereof and the rim 30 engage the uppermost adsorbent unit 17 and force it downwardly into engagement with the lower adsorbent unit 17 and force both adsorbent units downwardly until the underside of the lower adsorbent unit 17 bears against enlarged frustoconical portion 14 as shown in FIG. 1. This will cause the outer cylindrical side walls 20 of adsorbent units 17 to bear against the inner cylindrical surface of housing 39 to essentially provide a seal therewith. In addition, the annular seal-type periphery 30, which has an interference fit with the inside surface of housing 39, will bear firmly against the inside of housing 39. The grid 27 will remain in position on elongated tubular member 12 because of the locking action between the downwardly extending serrations 13 on tube 12 and the upwardly extending serrations 35 within central tubular member 34 of grid 27. The interference connection between the outer edge of rim 29 at 30 and the forcing of the outer surfaces 20 of the adsorbent units 17 against the inside surface of housing 39 will effectively center tube 12 within housing 39 and also hold it centered within housing 39. Thereafter, the refrigerant tube 52 is inserted within tubular member 12 and top 50 of the receiver dryer is welded to housing 39. The inside surface 56 of tubular member 12 is extremely close to refrigerant tube 52, and it is preferably in touching relationship. In the event that tube 12 should move downwardly so that the bottom scalloped edge 15 of frustoconical enlarged portion 14 should come to rest on bottom 40, the scalloped edge 15 will permit refrigerant to flow past it and into the opening 48 of tube 52.

While two adsorbent units 17 have been shown as a part of the adsorbent unit assembly, it will be appreciated that in certain installations only one adsorbent unit need be used, or in other installations it may be desirable to use more than two adsorbent units. In addition to the foregoing, while the interfitting connection between the grid 27 and tube 12 has been shown as oppositely disposed serrations, it will be appreciated that any other suitable type of interfitting connection may be used or an external member may be mounted on tube 12 to press grid 27 downwardly into pressing engagement with the upper adsorbent unit 17.

In addition, it will be appreciated that the underside of the lowermost adsorbent unit 17 need not come to rest on the frustoconical portion 14 but an enlarged portion may be placed on the tube 12 for the underside of the adsorbent unit 17 to bear against, and this can be a separate member mounted on tube 12 above the frustoconical enlarged portion 14.

Figure 11:
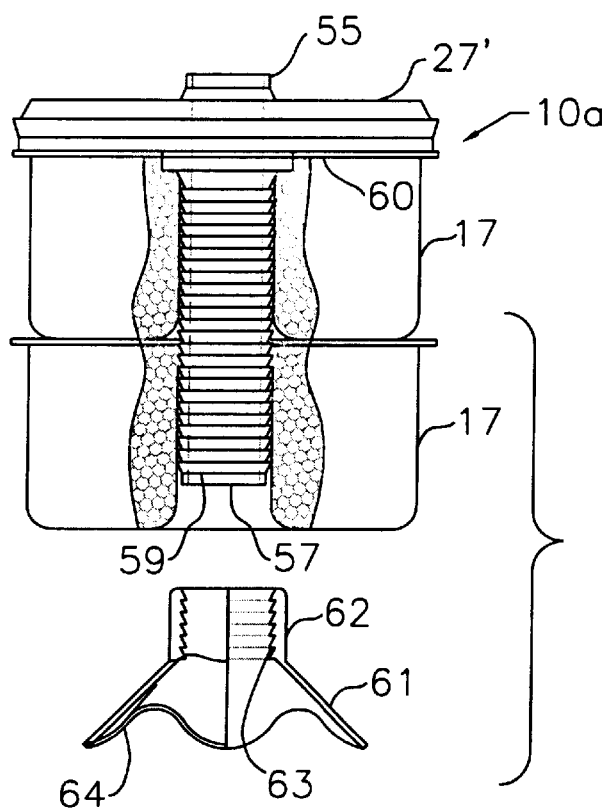
FIG. 11 is a partially fragmentary exploded view of a flow-through adsorbent unit assembly wherein the frusto-conical end portion is separate from the tubular portion.
Figure 12:
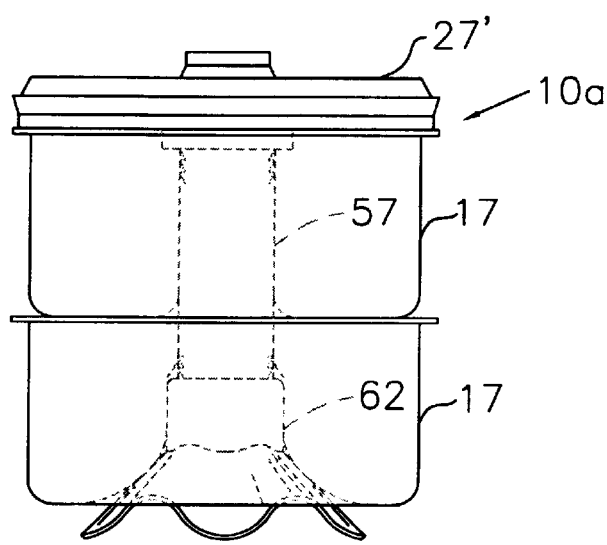
FIG. 12 is a side elevational view of the components of FIG. 11 in fully assembled condition.

Another embodiment of the present invention is shown in FIGS. 11 and 12. The adsorbent unit 10a includes a holder 55 which includes an elongated member 57 having upwardly oriented annular serrations 59 throughout the length of tubular portion 57 which terminates at the underside 60 of a molded plastic grid 27' which may be identical in all respects to molded plastic grid 27 (FIGS. 7–10) except that grid 27' is molded integrally proximate the top of elongated tubular serrated member 57. A pair of adsorbent units 17, such as shown in FIG. 2, are mounted on elongated tubular member 57. The adsorbent unit 10a of FIGS. 11 and 12 differs from that of FIGS. 1–3 in that the frustoconical end portion is formed with a cylindrical serrated end 62 having downwardly oriented annular serrations 63 so that the cylindrical end 62 can be mounted on the lower end of elongated hollow tubular member 57 and it can be moved upwardly to a required extent to firmly clamp adsorbent units 17 between frustoconical member 61 and the underside of grid 27'. Frustoconical member 61 has an undulating lower edge 64. The adsorbent unit assembly 10a is mounted on a cylindrical pipe 52, such as shown in FIG. 1, in the same manner as described above relative to adsorbent unit assembly 10 of FIGS. 1–3.

Figure 13:
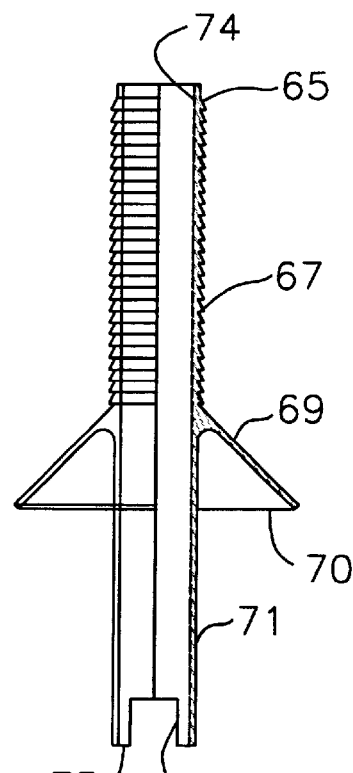
FIG. 13 is an alternate embodiment of a tubular member which can be used with the embodiment shown in FIG. 1.

In FIG. 13 an alternate form of tubular member 65 is disclosed which may be substituted for the elongated tubular member 12 of FIG. 1. In this respect, the elongated tubular member 65 has downwardly oriented annular serrations 67, and it has a frustoconical member 69 integrally formed therewith, with the frustoconical member having a circular annular edge 70. An elongated tube 71 is formed integrally as part of the elongated tubular member 65, and at its lower end it has two diametrically opposite cutouts 72. A molded plastic grid of FIGS. 7–10 is to be mounted on the upper end of tubular member 65 with at least one adsorbent unit 17 mounted between it and frustoconical member 69. The bottom edge 73 of elongated tube 71 will rest on the bottom 40 (FIG. 1) of receiver-dryer 37, and the internal side 74 of tubular member 65 will have a close fit with receiver pipe 52. When the bottom edge 73 rests on receiver bottom 40, flow into elongated tube 71 will be through diametrically opposed cutouts 72.

Figure 15:
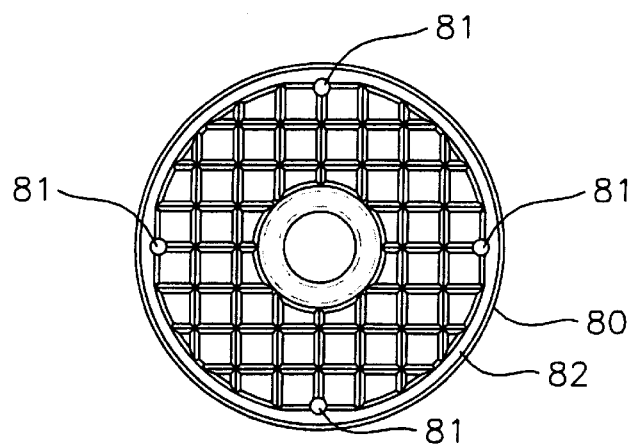
FIG. 15 is a plan view taken substantially in the direction of arrows 15—15 of FIG. 14.
Figure 14:
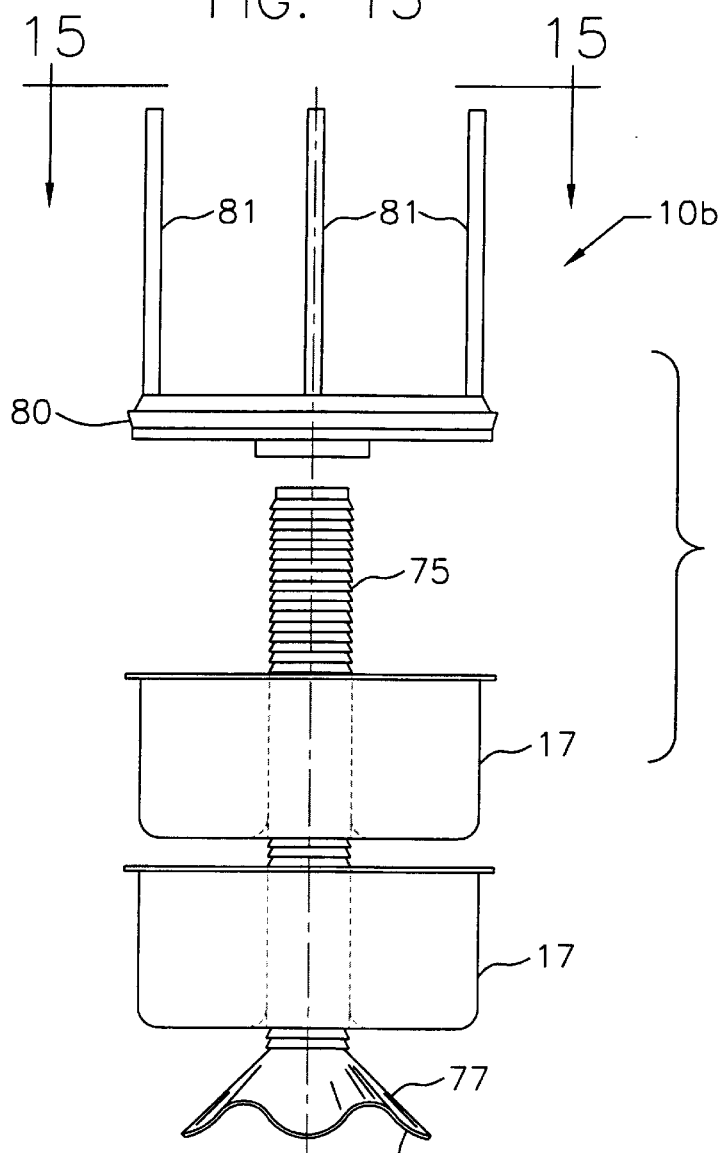
FIG. 14 is a side elevational partially exploded view of still another embodiment of the present invention.

Another embodiment 10b of the present invention is shown in FIGS. 14–16. In this embodiment the elongated tubular member 75 having an integral frustoconical member 77 at its lower end may be identical to elongated member 11 and frustoconical member 14 of FIG. 1. As shown in FIG. 1, the bottom edge 79 of frustoconical member 77 is fluted. A grid 80 is mounted on tubular member 75. The grid 80 may be identical in all respects to grid 27 of FIGS. 7–10 except that it has four legs 81 molded integrally with rim 82 thereof. The fluted edge 79 of frustoconical member 77 can rest on the bottom 40 of receiver 37 (FIG. 1) and the upper ends 82 of legs 81 will bear against the underside of receiver top 50. The dimensions are such that the foregoing arrangement will cause the sides of adsorbent units 17 to bulge out into good contact with the inner surface of cylindrical housing 39 of receiver-dryer 37. Instead of having the fluted edge 79 of frustoconical member 77 rest on bottom 40, a rolled bead (not shown) may be provided on pipe 52 which is to be engaged with the inner upper narrow end of frustoconical member 77 to thereby limit the downward movement of the latter.

Figures 18, 19:
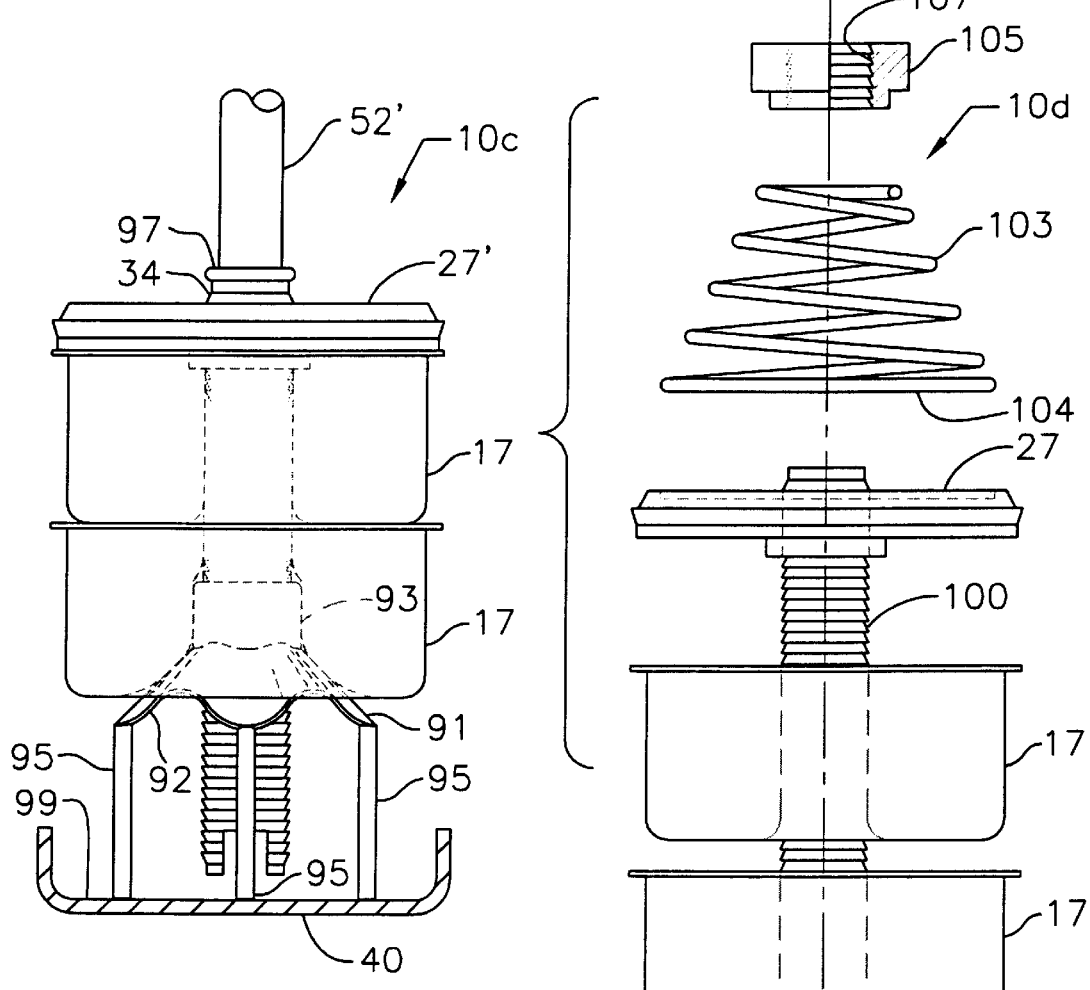
FIG. 18 is a fragmentary side elevational view of another embodiment of a flow-through adsorbent unit assembly mounted on a central tube of a receiver.
FIG. 19 is a partially exploded view of still another embodiment of a flow-through adsorbent unit assembly.

In FIGS. 17 and 18 yet another embodiment 10c of the present invention is shown. In this embodiment the holder 85 includes an elongated tube 87 having upwardly oriented annular serrations 89 and a grid 27' integrally molded therewith at its upper end. Diametrically opposed cutouts 90 may be located at the lower end of tube 87. A pair of adsorbent units 17 are mounted on tubular member 87. A frustoconical member 91 is provided with a fluted lower edge 92. Molded integrally with frustoconical member 91 is a tubular member 93 having internal downwardly oriented annular serrations 94. Four legs 95 have their upper ends molded integrally with fluted edge 92 at 90° intervals.

The embodiment of FIGS. 17 and 18 is installed in a receiver dryer 37 in the following manner. The holder 85 is in assembled condition with adsorbent units 17 mounted on elongated tube 87 between frustoconical member 91 and grid 27' (FIG. 18). The central refrigerant pipe 52 (FIG. 1) is inserted through tubular member 87 until a rolled bead 97 on pipe 52' engages the top of central tubular member 34 (FIGS. 7–10) of grid 27'. Pipe 52' is identical to pipe 52 of FIG. 1 except that it has the rolled bead 97 thereon. Thereafter, when the pipe 52' with the receiver top 50 are placed in position on the receiver body 39, the lower ends of legs 95 will bear against the inner surface 99 (FIG. 18) of receiver bottom 40. The dimensions are such that the distance between bottom inner surface 99 and rolled bead 97 will cause the sides of adsorbent units 17 to bulge outwardly into contact with the internal surface of receiver housing 39.

In FIGS. 19 and 20 another embodiment 10d of an adsorbent unit assembly is shown. In this embodiment the elongated tube 100 may be identical in all respects to elongated tube 12 of FIG. 4 including the downwardly oriented annular serrations and an integral frustoconical member 101 having a fluted edge 102. Additionally, the adsorbent units 17 are identical to those described relative to FIG. 2. A grid member 27 may be identical in all respects to the grid member of FIGS. 3 and 7–10. In addition to the foregoing structure, a coil spring 103 has a lower end 104 which bears on the upper surface of grid member 27. Also, a nut 105 is provided having internal annular upwardly oriented serrations 107. The nut 105 is installed as shown in FIG. 20, and it is moved downwardly to compress spring 103 between it and grid member 27. As can be seen from FIG. 20, the underside 107 of adsorbent unit 17 bears on the outer surface of frustoconical member 101, and the spring 103 bears on the upper surface of grid member 27. Thus, adsorbent units 17 are compressed between grid member 27 and frustoconical member 101. After the adsorbent unit assembly 10d has been installed, if the adsorbent within adsorbent units 17 should settle, the spring 103 will cause the grid member 27 to move downwardly to maintain the adsorbent in good compacted form, which, in turn, will cause the outer sides of the adsorbent unit 17 to bulge outwardly into good contact with the inner surface of housing 39. In an adsorbent unit assembly, such as shown in FIGS. 19 and 20, the central tubular member of grid member 27 which engages the outer surface of tubular member 100 need not be serrated because it can be slidably mounted on the outer surface of tube 100, considering that the serrations of the nut 105 and spring 103 will prevent grid member 27 from moving upwardly.

In FIGS. 21 and 22 yet another adsorbent unit assembly 10e is shown. This embodiment is essentially a reverse of the embodiment 10d of FIGS. 19 and 20. The holder 109 includes a tubular member 110 having upwardly oriented annular serrations 111 and a grid member 27" integrally molded with the top thereof. The other structure of grid member 27" may be identical to that shown in FIGS. 7–10. A pair of adsorbent units 17 are mounted on elongated tubular member 110. In addition, a frustoconical member 112 is provided having an annular tubular extension 113 molded integrally therewith which slides up onto the lower end of tubular member 110. A coil spring 114 is provided which encircles the lower end of tubular member 110, and a nut 115 is provided with internal annular downwardly oriented serrations 117 which engage the upwardly oriented annular serrations 111 of tubular member 110. The upper end 118 of spring 114 bears on an annular stepped portion on the inside of frustoconical member 112, and the lower end 120 of spring 114 bears on nut 115. In assembled condition, the compressed spring 114 places constant compression on adsorbent units 17 which are held between frustoconical member 112 and grid 27". While the tubular portion 113 of frustoconical member 112 has been described above as not having internal serrations, it will be appreciated, if desired, it can have downwardly oriented annular internal serrations to mesh with the upwardly oriented annular serrations 111 of tubular member 110.

As with the embodiment of FIGS. 19 and 20, in the embodiment of FIGS. 21 and 22, the compressed spring 114 exerts continuous force on adsorbent units 17 so that they will remain in good contact with the internal side of receiver housing 39 even though the adsorbent therein may tend to settle.

While preferred embodiments of the present invention have been disclosed, it will be appreciated that it is not limited thereto but may be otherwise embodied within the scope of the following claims.

What is claimed is:

1. An adsorbent unit assembly comprising a holder, an elongated member on said holder, an enlarged portion on said elongated member, a cylindrical adsorbent unit, a central opening in said cylindrical adsorbent unit receiving said elongated member, and a grid on said elongated member on the opposite side of said adsorbent unit from said enlarged portion.

2. An adsorbent unit assembly as set forth in claim 1 wherein said enlarged portion is of generally frustoconical configuration, a smaller end on said frustoconical configuration secured to said elongated member, and a larger end on said frustoconical configuration remote from said smaller end.

3. An adsorbent unit assembly as set forth in claim 2 wherein said larger end is fluted.

4. An adsorbent unit assembly as set forth in claim 1 wherein said enlarged portion is located at an end of said elongated member.

5. An adsorbent unit assembly as set forth in claim 1 wherein said grid has an outer circular configuration.

6. An adsorbent unit assembly as set forth in claim 1 wherein said grid has a central grid portion mounted on said elongated member.

7. An adsorbent unit assembly as set forth in claim 6 wherein said central grid portion comprises a grid opening receiving said elongated member.

8. An adsorbent unit assembly as set forth in claim 7 including serrations on the outer surface of said elongated member.

9. An adsorbent unit assembly as set forth in claim 8 including second serrations on said grid opening engaging said serrations on said elongated member.

10. An adsorbent unit assembly as set forth in claim 6 wherein said grid includes a circular outer periphery, and an edge seal on said circular outer periphery.

11. An adsorbent unit assembly as set forth in claim 10 including an interfitting connection between said grid and said elongated member.

12. An adsorbent unit assembly as set forth in claim 11 wherein said interfitting connection comprises first serrations on said elongated member, and second serrations on said central grid portion.

13. An adsorbent unit assembly as set forth in claim 12 wherein said enlarged portion is of generally frustoconical configuration, a smaller end on said frustoconical configuration secured to said elongated member, and a larger end on said frustoconical configuration remote from said smaller end.

14. An adsorbent unit assembly as set forth in claim 13 wherein said larger end is fluted.

15. An adsorbent unit assembly as set forth in claim 1 including an interfitting connection between said grid and said elongated member.

16. An adsorbent unit assembly as set forth in claim 15 wherein said grid includes a circular outer periphery, and an edge seal on said circular outer periphery.

17. An adsorbent unit assembly as set forth in claim 1 wherein said adsorbent unit is compressed between said grid and said enlarged portion.

18. An adsorbent unit assembly as set forth in claim 1 including a plurality of cylindrical adsorbent units compressed between said grid and said enlarged portion on said elongated member.

19. An adsorbent unit assembly as set forth in claim 1 wherein said grid is integral with said elongated member.

20. An adsorbent unit assembly as set forth in claim 19 wherein said enlarged portion is attachable to said elongated member.

21. An adsorbent unit assembly as set forth in claim 19 including a plurality of legs extending outwardly from said enlarged portion.

22. An adsorbent unit assembly as set forth in claim 21 wherein said enlarged portion is attachable to said elongated member.

23. An adsorbent unit assembly as set forth in claim 19 including a spring biasing said enlarged member toward said grid.

24. An adsorbent unit assembly as set forth in claim 1 wherein said grid is a separate member which is mountable on said elongated member.

25. An adsorbent unit assembly as set forth in claim 24 including a plurality of legs extending upwardly from said grid.

26. An adsorbent unit assembly as set forth in claim 24 including a spring biasing said grid toward said enlarged member.

27. In a receiver dryer having a cylindrical housing and a central tube within said housing, the improvement comprising a holder, an elongated member on said holder positioned on said central tube, an enlarged member on said elongated member, a grid on said elongated member, at least one adsorbent unit having an outer periphery with said adsorbent unit being mounted on said elongated member and compressed between said grid and said enlarged member with said outer periphery of said adsorbent unit in engagement with said cylindrical housing.

28. In a receiver dryer as set forth in claim 27 including a circular outer periphery on said grid in engagement with said cylindrical housing.

29. In a receiver dryer as set forth in claim 28 wherein said elongated member is tubular.

30. In a receiver dryer as set forth in claim 29 wherein said enlarged member is frustoconical with a smaller end mounted on said elongated tubular member and a larger end remote from said elongated member.

31. In a receiver dryer as set forth in claim 30 wherein said larger end is fluted.

32. In a receiver dryer as set forth in claim 27 including an interfitting connection between said grid and said elongated member.

33. In a receiver dryer as set forth in claim 32 wherein said enlarged member is frustoconical with a smaller end mounted on said elongated member and a larger end remote from said elongated member.

34. In a receiver dryer as set forth in claim 33 wherein said larger end is fluted.

35. In a receiver dryer as set forth in claim 27 wherein said grid is integral with said elongated member.

36. In a receiver dryer as set forth in claim 35 wherein said enlarged portion is attachable to said elongated member.

37. In a receiver dryer as set forth in claim 35 including a plurality of legs extending outwardly from said enlarged portion.

38. In a receiver dryer as set forth in claim 37 wherein said enlarged portion is attachable to said elongated member.

39. In a receiver dryer as set forth in claim 27 including a spring biasing said enlarged member toward said grid.

40. In a receiver dryer as set forth in claim 27 wherein said grid is a separate member which is mountable on said elongated member.

41. In a receiver dryer as set forth in claim 40 including a plurality of legs extending upwardly from said grid.

42. In a receiver dryer as set forth in claim 40 including a spring biasing said grid toward said enlarged member.

\* \* \* \* \*